United States Patent [19]

Bruhn

[11] 4,275,981

[45] Jun. 30, 1981

[54] VEHICLE MOUNTED MOTORCYCLE CARRIER

[75] Inventor: Larry C. Bruhn, Springfield, Oreg.

[73] Assignee: LBF Properties, Inc., Springfield, Oreg.

[21] Appl. No.: 7,432

[22] Filed: Jan. 29, 1979

[51] Int. Cl.³ .............................................. B60R 9/10
[52] U.S. Cl. ............................ 414/462; 224/42.03 B; 224/42.06; 224/42.13
[58] Field of Search ............... 224/42.03 B, 42.03 R, 224/42.03 A, 42.04, 42.06, 42.07, 42.08, 42.43, 42.44, 42.13, 42.05, 42.12, 42.21, 42.24, 42.25, 273; 414/462

[56] References Cited

U.S. PATENT DOCUMENTS

| | | |
|---|---|---|
| 2,512,267 | 6/1950 | Donnelley ............... 224/42.03 B |
| 3,176,903 | 4/1965 | Farley ...................... 224/42.03 B |
| 3,251,520 | 5/1966 | Van Dyke et al. ....... 224/42.03 B |
| 3,348,713 | 10/1967 | Will ..................... 224/42.03 B UX |
| 3,425,605 | 2/1969 | Triboulet ...................... 224/42.06 |
| 3,720,333 | 3/1973 | Vaughn ................. 224/42.03 B X |
| 3,779,580 | 12/1973 | Thelen .................... 224/42.06 X |
| 3,912,098 | 10/1975 | Nicotra ............................ 414/462 |
| 4,128,195 | 12/1978 | Collins ................... 224/42.03 B |

FOREIGN PATENT DOCUMENTS 1084568  1/1955  France .................................. 224/42.13

Primary Examiner—Robert J. Spar
Assistant Examiner—Jerold M. Forsberg
Attorney, Agent, or Firm—Eugene M. Eckelman

[57] ABSTRACT

A pair of support arms are arranged for attachment to a vehicle, and a channel-shaped ramp is arranged to seat on these arms for holding a motorcycle. This ramp has a pivot connection with one arm and extends beyond such pivot connection in a direction opposite from the other arm whereby upon tilting the ramp off the other arm, a motorcycle can be wheeled up the ramp to a point such that the combined centers of gravity of the motorcycle and ramp will cause the latter to pivot down into support on the other arm. A releasable latch is provided to hold the ramp down in a non-pivoting position. The ramp has a depending loop for removably receiving an auxiliary ramp which forms an extension thereof. The present carrier may be associated with various types of support means on a vehicle such as support means arranged for mounting on a bumper, bumper guard or support means combined with a spare wheel mount.

4 Claims, 9 Drawing Figures

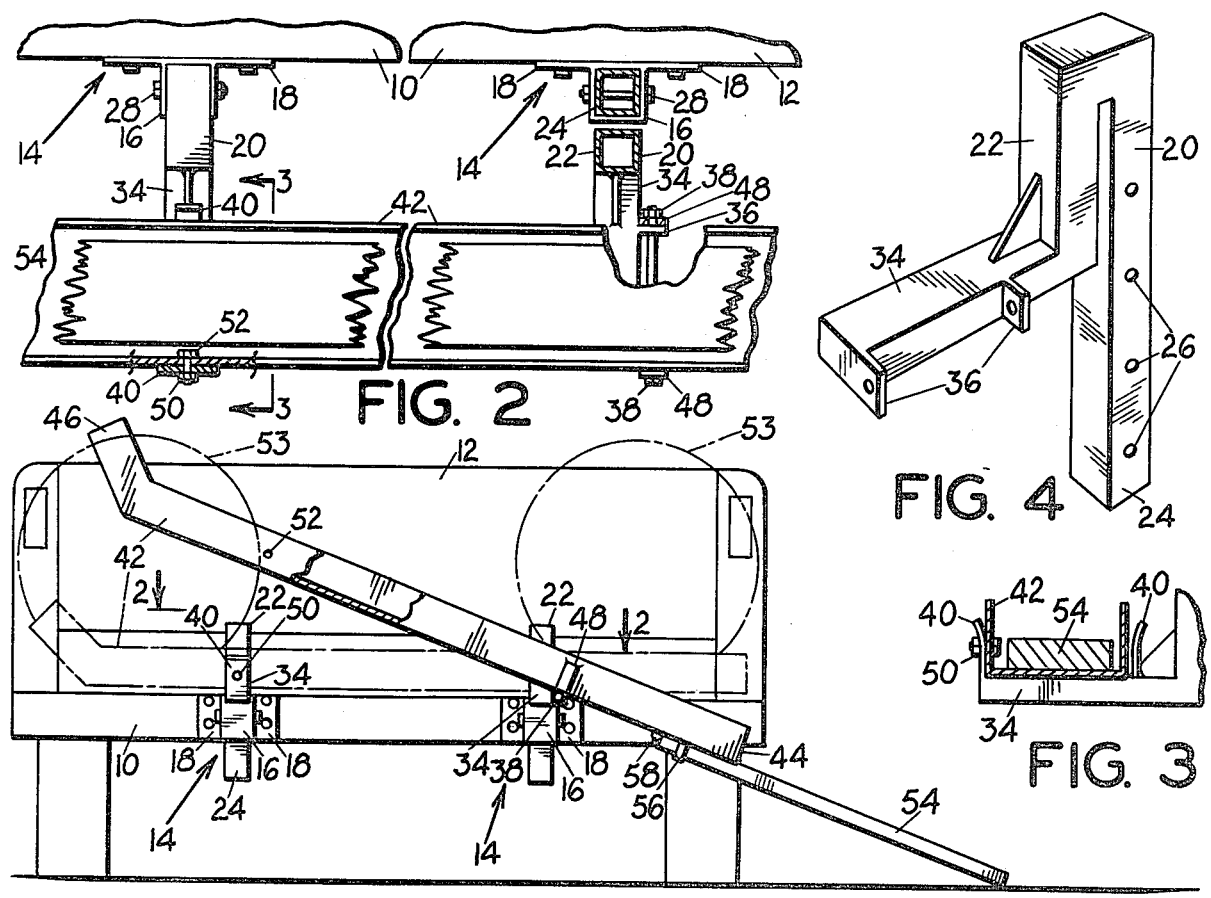
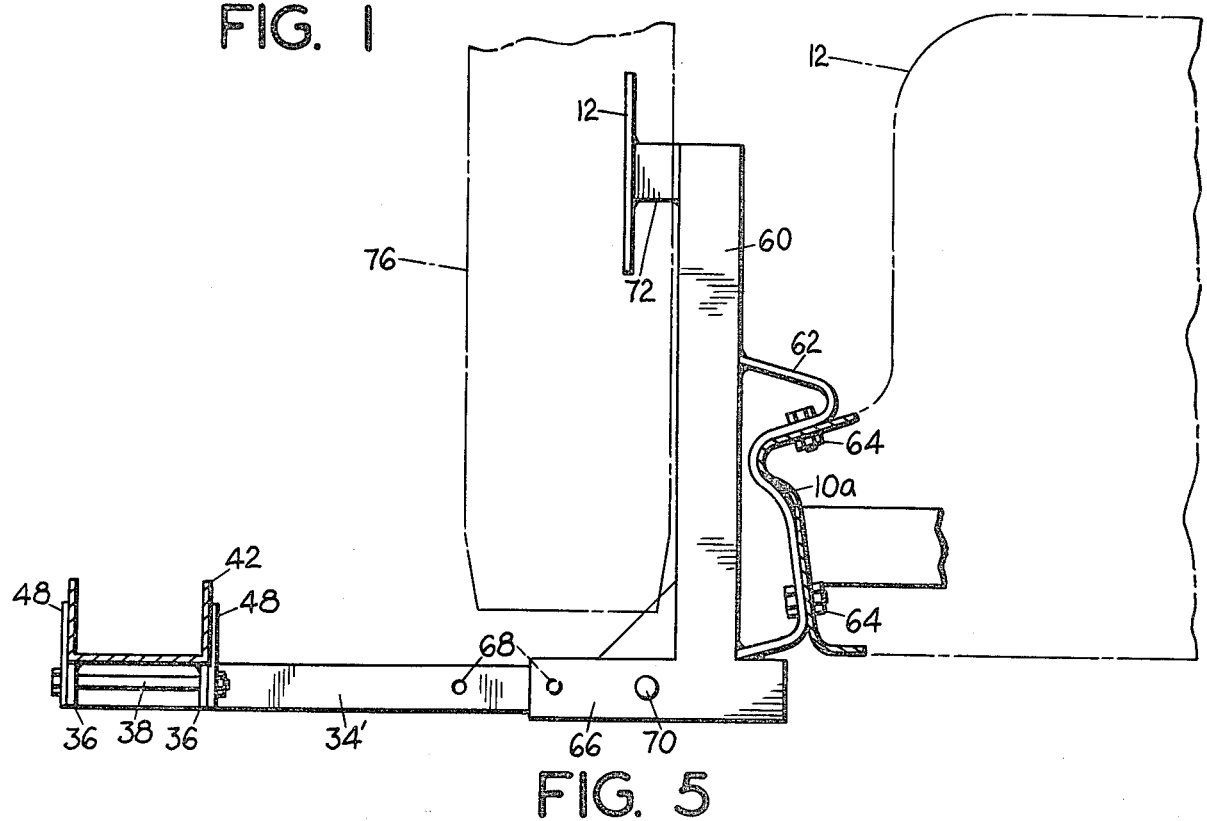

VEHICLE MOUNTED MOTORCYCLE CARRIER

BACKGROUND OF THE INVENTION

This invention relates to new and useful vehicle mounted motorcycle carriers.

Motorcycle carriers have heretofore been provided for vehicles by means of which a motorcycle can be carried at the front or rear thereof, such as on the bumper. These prior structures comprise brackets or the like secured to the vehicle or releasably attached thereto such as by hooking engagement on the bumper. They are not satisfactory, however, in that it is difficult to load and unload a motorcycle because the motorcycle must be lifted into place onto the carrier. Bumper mounted carriers previously used also have the disadvantage that the gravity hook connection thereof is not a positive and safe connection.

SUMMARY OF THE INVENTION

According to the present invention and forming primary objectives thereof, a vehicle mounted motorcycle carrier is provided which allows for easy loading and unloading of the motorcycle, which safely holds the motorcycle in a fixed position on the vehicle, and which is relatively simplified and economical to manufacture.

In carrying out the objectives of the invention, a pair of support means is provided having mounting means arranged to mount said support means in spaced relation on a vehicle. An arm projects outwardly from each of the support means and a ramp is arranged to be seated on these arms. Pivot means connect the ramp to one of the arms. The ramp is arranged to support a motorcycle thereon and has an extension beyond its pivot connection such that when it is tilted on its pivot means with its extension downward a motorcycle can be readily wheeled thereon. When the motorcycle is rolled to the point that the combined centers of gravity of the motorcycle and the ramp member are beyond the pivot means, the ramp lowers onto the other arm. The invention includes a releasable auxiliary ramp arranged to form an extension of the main ramp for ease in loading and unloading. The invention also includes various structures for attaching it to vehicles for versatility.

The invention will be better understood and additional objects and advantages will become apparent from the following description taken in connection with the accompanying drawings.

BRIEF DESCRIPTION OF THE DRAWINGS

FIG. 1 is a rear elevational view of the present carrier as attached in one manner to a vehicle, one position of the ramp being shown in broken lines;

FIG. 2 is a fragmentary and foreshortened plan view of the carrier of FIG. 1, this view having a portion thereof broken away for clarity and being taken on the line 2—2 of FIG. 1 with the ramp shown in full lines;

FIG. 3 is a fragmentary sectional view taken on the line 3—3 of FIG. 2;

FIG. 4 is a perspective view of a support member forming a part of the invention;

FIG. 5 is a side elevational view of a modified form of support means of the invention;

DETAILED DESCRIPTION OF PREFERRED EMBODIMENTS

Figure 6:
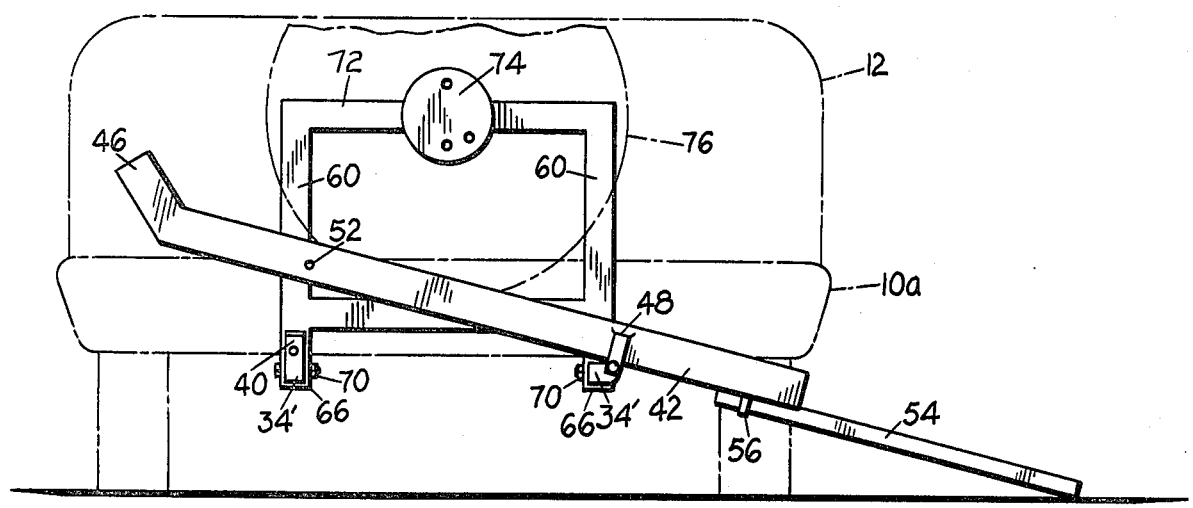
FIG. 6 is a front elevational view of the structure of FIG. 5.

With particular reference to the drawings, FIGS. 1–4 illustrate the invention as well as a first form of support means for attachment to a vehicle. Such embodiment is arranged to be mounted on the rear bumper 10 of a pickup truck 12. The support means for the invention includes a pair of brackets 14 of identical construction, each bracket including a vertical socket portion 16 and lateral flanges 18 integral with the socket portion for providing a bolted or other suitable connection to the bumper.

The carrier of the invention for support on brackets 14 comprises a pair of inverted U-shaped body members 20 having a pair of legs 22 and 24, one such body member being shown apart from other structure in FIG. 4. Legs 24 are extended downwardly relative to legs 22 and are provided with a plurality of lateral apertures 26 extending therethrough and adapted for engagement by removable cross bolts 28 removably extending through suitable apertures in the vertical socket portions 16. By selected engagement of the cross bolts 28 in the apertures 26, and in the apertures in the socket portions 16, the body members 20 can be attached at selected heights on the bumper, the space between the legs 22 and 24 of the body members allowing the latter to be lowered so that the bottom end of the leg 22 is below the top of the socket portion 16. This adjustment provides versatility in adapting the carrier to pickups having body portions of different elevations from the ground.

Extending forwardly and integrally from each body member 20 is a horizontal arm 34 having a flat top surface. The arms 34 of one of the body members, namely, that body member shown in FIG. 4 and the right hand one in FIGS. 1 and 2, has a pair of laterally extending ears 36 on the outer side thereof arranged removably to receive a pivot pin 38. Such pin has releasable securement to the ears 38 by any suitable means such as by a threaded nut connection. The other arm 34 has a pair of upwardly extending fingers 40, best seen in FIG. 3, disposed in longitudinally spaced relation on the arm and forming a cradle therebetween. These fingers are curved slightly outwardly in an arrangement providing a widened opening therebetween at the top.

Associated with the arms 34 is a channel-shaped ramp 42 having an open end 44 and an upturned end 46. Ramp 42 has a pair of depending ears 48 with apertures therein arranged to receive the pivot pin 38 associated with ears 36 on the arm arm 34, whereby upon connection of the pivot pin 38 in the ears 36 and 48, the ramp 42 is arranged to have a pivotal support connection on the one arm and a free support on the top surface of the other arm between the cradle fingers 40. The ramp 42 extends outwardly beyond the respective arms, and when tilted up as shown in full lines in FIG. 1 the one end is lowered toward the ground. The motorcycle is rolled up the ramp and upon movement thereof to a point such that the center of gravity of the motorcycle and ramp is beyond the pivot point, the ramp will lower onto the other arm. A lock bolt 50 is mounted in one of the fingers 40 and has releasable engagement in an aperture 52 in the ramp to positively anchor this end of the ramp down while travelling. Wheels of a loaded motorcycle are shown in borken lines in FIG. 1 and designated by the numeral 53.

Although the dimensions of the ramp may be such that its loading end will be close to the ground when tilted up, such may not be the case in association with some vehicles, such as a vehicle shown in FIG. 1. In such instance and as shown in FIG. 1, an auxiliary ramp 54 is used in combination with the ramp 42 to make it easier to move a motorcycle onto the ramp. For this purpose, the ramp 42 has a closed loop or strap member 56 extending down from its bottom wall at a point a short distance inwardly from the open end 44. This loop is arranged freely to receive one end of the auxiliary ramp 54 as shown in full lines in FIG. 1, whereby the extension formed by the auxiliary ramp will reach the ground and also serve to reduce the angle of inclination necessary to roll the motorcycle up the ramp. The auxiliary ramp is merely held in place by friction and is removed while travelling. A stop 58 is secured to the bottom of the ramp to limit inward installing movement of the auxiliary ramp 54. The auxiliary ramp is similarly used when unloading the motorcycle and is of a length about equal to the span between facing tire surfaces whereby when the motorcycle is loaded in place, this ramp can be stored on the bottom of the main ramp between the wheels. To allow such storage, the auxiliary ramp 54 and the loop 56 are of less width than the distance between the upstanding walls of ramp 42.

FIGS. 5 and 6 illustrate a modified form of support means of the invention for attachment to a vehicle. In this embodiment, a pair of upright standards 60 are integral with rear heavy duty strap portions 62 which are contoured to fit a bumper 10a of a vehicle, such as a front bumper and which are secured thereto by suitable means such as bolts 64. The bottom ends of standards 60 have forwardly facing tubular socket portions 66 arranged to recieve horizontal arms 34' similar to the arms 34 in FIG. 1 in that one arm has ears 36 arranged to receive a pivot pin 38 also engageable with ears 48 on the ramp 42 and the other arm 34' has the upstanding fingers 40. Socket portions 66 and the arms 34' have matching apertures 68 arranged for releasable connection by cross bolts 70, a plurality of the apertures in the arms being provided for length adjustment of the arms. Standards 60 can be secured together by cross bars 72 and the upper bar provided with a mount 74 for a tire 76 whereby the structure is arranged to serve as a spare wheel support as well as a motorcycle carrier.

Figure 7:
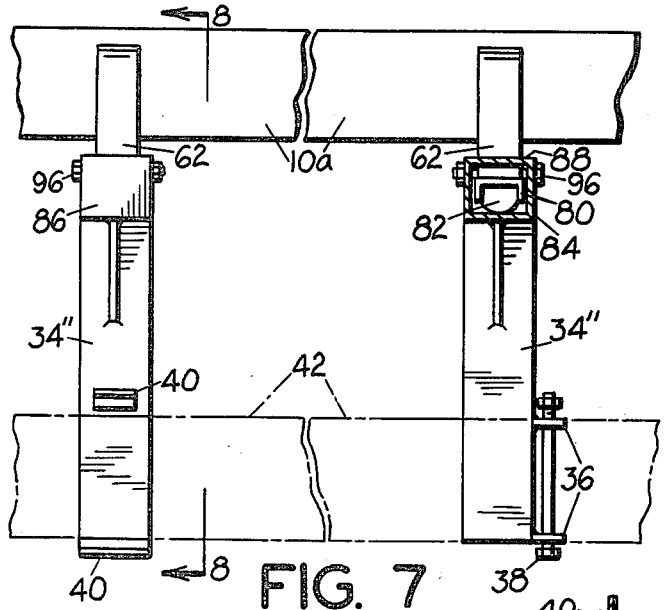
FIG. 7 is a foreshortened plan view of a further modified form of support means of the invention.
Figure 8:
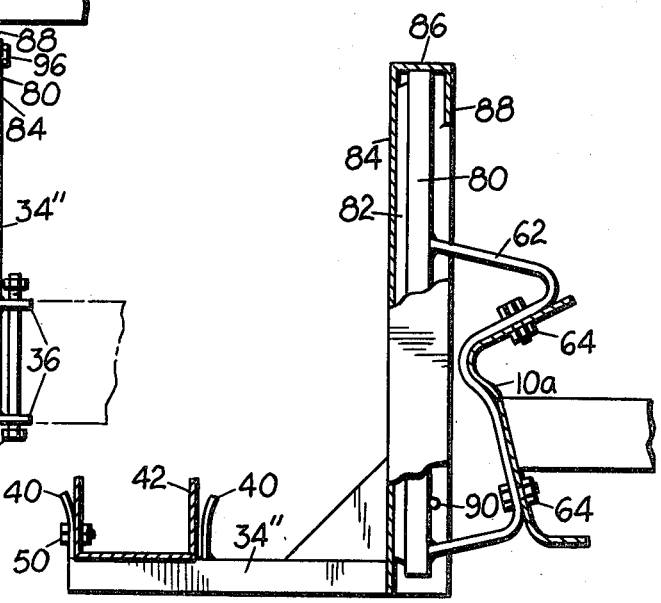
FIG. 8 is a sectional view of the structure of FIG. 7, this view being taken on the line 8—8 of FIG. 7 and a portion thereof being broken away.

FIGS. 7 and 8 show another embodiment of support means which may be associated with the present invention. This embodiment is arranged for association with vertically elongated bumper guards 80 of a type having an integral heavy duty mounting strap portion 62 which are contoured to fit a bumper 10a of a vehicle and which are secured thereto by suitable means such as bolts 64. The bumper guards 80 include a vertical body portion with a resilient front facing insert 82. The carrier of this embodiment comprises a pair of vertically disposed, rearwardly facing channel-shaped body members 84 having a top wall 86 and a partial rear wall 88 at the top. The body member 84 is dimensioned so as to be capable of being moved down over the vertical body portion 80 of the bumper guard and fitted on the latter from the front, with the upper end of the bumper guard being disposed in the inverted pocket formed at the top of the body member. The body members 84 of the carriers and the bumper guards have aligned apertures 90 arranged to removably receive a lock bolt 96. The body members 84 have arms 34" with structure identical to the arms 34 in the embodiment of FIG. 1 for association with the ramp 42.

Figure 9:
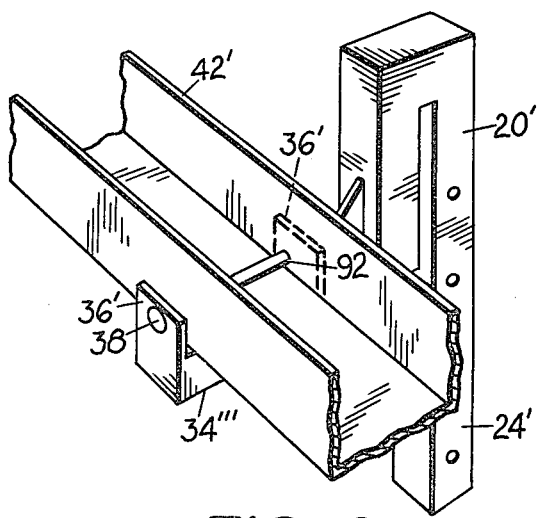
FIG. 9 is a perspective view similar to FIG. 4 but showing a modification thereof.

FIG. 9 illustrates a slightly modified form of body member 20' from that shown in FIG. 4. In this embodiment, the apertured ears 36' are provided on the top of arm 34''' instead of on the side and the ramp 42' does not have depending ears 48. To provide the pivot connection of the ramp to arm 34''', a bore 92 is made through the ramp to receive the pivot pin 38. In this arrangement, the ramp can be installed in a selected lateral position on a vehicle as desired by the user. This manner of mounting is useful also in readily adapting the ramp to spacings of the suport brackets 14, FIG. 1, which may vary with different makes of vehicles.

According to the present invention, a simplified motorcycle carrier is provided for vehicles which is easily adaptable by selected mounting means to various types of vehicles. The tilting ramp provides easy loading and unloading of a motorcycle and requires little or no manual lifting of such motorcycle. It is to be understood that the forms of my invention herein shown and described are to be taken as preferred examples of the same and that various other changes in the shape, size and arrangement of parts may be resorted to without departing from the spirit of my invention, or the scope of the subjoined claims. For example, the ramp 42 or 42' may be tapered to a wider dimension toward the open end 44 to accommodate wider tires that some motorcycles use on the rear wheel.

Having thus described my invention, I claim:

1. A motorcycle carrier for vehicles comprising
   (a) a pair of support means,
   (b) mounting means arranged to mount said support means in spaced relation on a vehicle,
   (c) a horizontal outwardly projecting arm on each of said support means,
   (d) a main ramp supported across said arms and having a loading end,
   (e) said ramp being of a length to support a motorcycle thereof and having upstanding side walls to receive motorcycle wheels therebetween,
   (f) apertured ear means on one of said arms and on said ramp receiving a pivot pin to provide pivotal connection of said ramp on said one arm,
   (g) said ramp being of a length to support a motorcycle thereon and having an extension beyond its pivot connection with said one arm in a direction opposite from said other arm, whereby upon tilting said ramp on its pivot means with said extension downward, a motorcycle is arranged to be wheeled up the loading end of said ramp to a point such that the combined centers of gravity of the motorcycle and ramp will cause the ramp to pivot down into support on said other arm,
   (h) a cradle on said other arm for confining the ramp therebetween,
   (i) releasable lock means engageable between said cradle and said ramp arranged to secure said ramp down on said other arm in a loaded position of the motorcycle,
   (j) socket means on the bottom of said ramp,
   (k) said socket means extending laterally across said ramp and having an opening facing said loading end, (l) and an auxiliary ramp arranged for removable telescoping fit in said socket means for forming an extension of said main ramp, (m) said socket and auxiliary ramp having a lateral width less than the distance between said side walls of said main ramp whereby said auxiliary ramp is arranged to be stored in said main ramp when not in use.

2. The motorcycle carrier of claim 1 wherein said mounting means comprises a pair of vertically opening socket members, each of said support means comprising an inverted u-shaped member having a first leg integral with said arm and a second leg arranged for downward insertion in said vertically opening socket, and latch means arranged for engagement between said socket members and said second leg releasably holding said support means in siad socket members, said second leg of said support means being elongated relative to said first leg and including a plurality of vertically spaced latch receiving means so as to be adjusted to selected vertical positions on said mounting means, said second leg being spaced from said first leg sufficiently to receive a portion of said mounting means whereby said support means is adjustable down in overlapping relation with said mounting means.

3. The motorcycle carrier of claim 1 wherein said mounting means comprises a spare wheel mount with means for attachment to a vehicle, said support means including bottom, outwardly facing socket portions arranged to telescopically receive said arms, and lock means releasably securing said arms in said socket portions.

4. The motorcycle carrier of claim 1 wherein said mounting means comprise upstanding bumper guards with means for attachment to a vehicle, said support means comprising channel-shaped body members with upper inverted pocket portions arranged to fit over and hang on said bumper guards, and lock means securing said body members to said bumper guards.

* * * * *